United States Patent Office 2,889,322
Patented June 2, 1959

2,889,322
3-METHANESULPHONYL PHENTHIAZINE DERIVATIVES

Robert Michel Jacob, Ablon-sur-Seine, and Gilbert Louis Regnier, Paris, France, assignors to Societe des Usines Chimiques Rhone-Poulenc, Paris, France, a French body corporate No Drawing. Application April 5, 1957
Serial No. 650,827

Claims priority, application France April 7, 1956

6 Claims. (Cl. 260—243)

This invention relates to new derivatives of phenthiazine and to processes of their production.

It is known that various 10-aminoalkyl-phenthiazines, -oxyphenthiazines and -dioxyphenthiazines, possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It is an object of the present invention to provide new phenthiazine derivatives which possess useful pharmacological properties. It is a further object of the invention to provide processes for the production of these new compounds.

The phenthiazine derivatives of the present invention are those which conform to the formula:

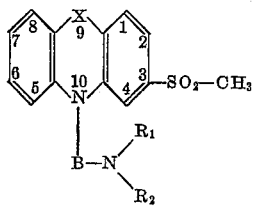

and their salts and their quaternary ammonium derivatives (wherein X represents a sulphur atom or an SO or $SO_2$ group, $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group such as pyrrolidino, piperidino, morpholino, piperazino, 4-alkylpiperazino, 4-hydroxyalkylpiperazino or 4-acyloxyalkylpiperazino, and B represents a straight or branched chain divalent aliphatic hydrocarbon group containing two to five carbon atoms (such, for example, as ethylene, propylene, isobutylene, trimethylene and tetramethylene) unsubstituted or substituted by a group

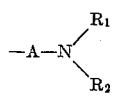

wherein A represents a single bond or a methylene group and $R_1$ and $R_2$ are as hereinbefore defined).

The term "lower alkyl" as used in this specification and in the appended claims means that the alkyl group in question contains not more than five carbon atoms.

The new phenthiazine compounds of the present invention may be prepared by the application of methods known per se for the production of 10-aminoalkyl-phenthiazines. The majority of methods so applied can be described generically as consisting in reacting a phenthiazine derivative of general formula:

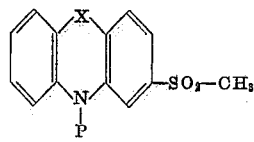

with a compound Q, the groups P and Q being such that Q will react with the phenthiazine derivative so as to introduce the substituent

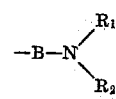

or a substituent easily convertible into

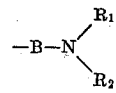

in the 10-position and, if necessary, thereafter transforming the convertible substituent into

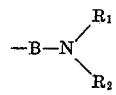

Preferred processes of manufacture are as follows:
(1) Interaction of a 3-methanesulphonylphenthiazine of the general formula:

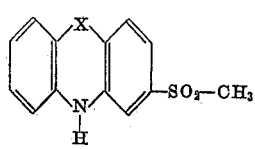

(wherein X is as hereinbefore defined) with a halogenoamine of the formula:

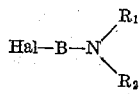

(where Hal represents a halogen atom and the other symbols are as hereinbefore defined) in the form of the base or of a salt thereof.

The reaction may be carried out with or without a solvent and in the presence or absence of a condensing agent. It is advantageous to operate in an aromatic hydrocarbon solvent medium (for example, benzene, toluene or xylene) in the presence of a condensing agent, preferably in the form of an alkali metal or derivative thereof (such as, for example, hydride, amide, hydroxide, alcoholate or metal alkyl or aryl) and especially in the form of metallic sodium, sodamide, powdered sodium or potassium hydroxide, lithium hydride, sodium tert-butylate, butyllithium or phenyllithium. The reaction is preferably carried out at the boiling temperature of the solvent. It is advantageous to use the halogenoamine in the form of the free base in solution, for example, in benzene, toluene or xylene, and to add this to the mixture of the other reactants in which the phenthiazine reactant of Formula III may already be present, at least in part, in the form of an alkali metal salt. The reaction may also be carried out using a salt of the halogenoamine but in this case a greater proportion of the condensing agent must clearly be used in order to neutralise the acid of the salt employed.

In the case where the divalent aliphatic hydrocarbon group —B— is an asymmetric branched chain, such for example, as

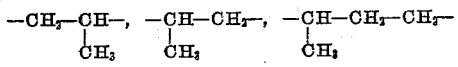

or

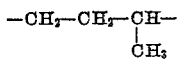

isomerisation can take place during the course of the reaction with the formation of a mixture of isomers. This isomerisation is analogous to that which takes place in the preparation of promethazine by the condensation of phenthiazine with a dimethylaminohalogenopropane [Charpentier, C. R., 225, 306 (1947)], a process which, using either 2-dimethylamino-1-chloropropane or 1-dimethylamino-2-chloropropane as starting material, gives the same final mixture in which promethazine predominates. Separation of the isomers may be effected by, for example, fractional crystallisation of salts such as the hydrochlorides from a suitable solvent such as alcohol.

(2) Decomposition of an amino-alkylphenthiazine-10-carboxylate of the formula:

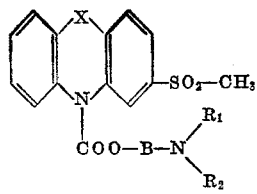

wherein the various symbols are as hereinbefore defined) by heating the carboxylate to a temperature above 100° C., and preferably between 150 and 220° C. There is no advantage in operating at higher temperatures which, in any event, can cause discoloration of the reaction products.

The reaction can be effected with the phenthiazine-10-carboxylate alone, i.e. without a diluent, or in an inert medium such as o-dichlorobenzene, diphenyl or diphenyl oxide, or in the classical diluents for decarboxylation, such, for example, as quinoline or weak bases of high boiling point.

During the course of the decomposition of the phenthiazine-10-carboxylate an isomerisation, similar to that hereinbefore described in process (1), takes place when the divalent aliphatic hydrocarbon group B is an asymmetric branched chain.

The phenthiazine-10-carboxylates employed as starting materials may be obtained by known methods. For example, they may be prepared by the action of a halide (or an ester) of a 3-methanesulphonylphenthiazine-10-carboxylic acid on the appropriate aminoalcohol; or by the action of a halogenoalkyl ester of such an acid on an appropriate amine.

(3) Interaction of an amine of the formula

(wherein $R_1$ and $R_2$ are as hereinbefore defined) and a reactive ester of the general formula

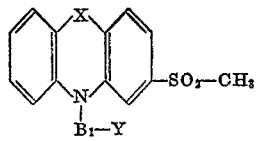

VI (wherein X is as hereinbefore defined, Y represents a residue of a reactive ester such as a halogen atom or a sulphonic ester residue and $B_1$ represents a straight or branched divalent aliphatic hydrocarbon group containing two to five carbon atoms or such a grouping substituted by a group —A—$Y_1$, A being as hereinbefore defined and $Y_1$ being a residue of a reactive ester or a grouping

(4) Alkylation by known methods of the corresponding primary or secondary amines, i.e. those compounds of Formula I in which the grouping

represents groups such as amino, monalkylamino or piperazino, leading to the production of compounds in which the grouping

represents such groups as alkylamino, dialkylamino-, 4-alkylpiperazino, 4-hydroxyalkylpiperazino or 4-acyloxyalkylpiperazino.

(5) Cyclisation, preferably in a solvent in the form of a substituted amide of a lower aliphatic acid such as formamide or acetamide, or in dimethylaniline, in the presence of a condensing agent (alkali metal hydroxide or carbonate) and optionally in the presence of a catalyst such as copper powder, of a derivative of general formula:

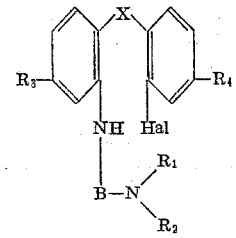

VII (wherein one of the groups $R_3$ and $R_4$ represents a hydrogen atom and the other a methanesulphonyl group, Hal represents a halogen atom (for example, chlorine or bromine) and the other symbols are as hereinbefore defined).

(6) In the case of the 4-acyloxyalkylpiperazino derivatives, acylation of the derivatives in which the grouping(s)

are 4-hydroxyalkylpiperazino groups.

(7) In the case where X represents an SO or $SO_2$ group oxidation by known methods of the corresponding phenthiazine compounds ($X=S$) of general Formula I.

Certain of the compounds conforming to general Formula I have an asymmetric carbon atom in the chain B, such as those compounds with the branched chain

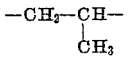

or

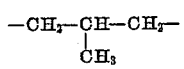

and consequently can exist in optically active forms. The invention includes within its scope the racemates as well as the corresponding optically active isomers of such compounds. The optically active isomers may be obtained by e.g. methods (1) and (3) described above by commencing with starting materials which are themselves optically active. They may also be prepared by optical resolution of the corresponding racemates.

The products prepared according to the invention have valuable pharmacodynamic properties. They have, in particular, a powerful action on the central nervous system, which renders them generally useful as neuroleptics, as potentiators of general anaesthetics (for example, hexobarbital and ether) and analgesics (for example, morphine), and as anti-emetics.

Compounds of the invention which are outstanding in their action on the central nervous system are those in which the group B is of the form —CH₂—CH₂—CH₂— or

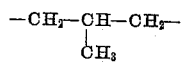

X is a sulphur atom and the grouping

represents monomethylamino, dimethylamino, diethylamino, pyrrolidino, piperidino, piperazino, 4-methylpiperazino, 4-ethylpiperazino, 4-hydroxyethylpiperazino or 4-acetoxyethylpiperazino, especially those in which the grouping

represents monomethylamino, dimethylamino, 4-methylpiperazino, 4-hydroxyethylpiperazino or 4-acetoxyethylpiperazino. Such compounds are particularly interesting as anti-emetics.

Compounds of the invention in which the grouping

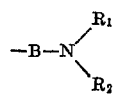

represents

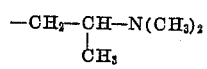

or

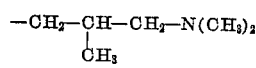

are powerful antihistaminics. Finally, those in which the chain B carries a group

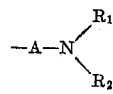

are particularly interesting as spasmolytics and local anaesthetics, especially those in which the group B is of the form

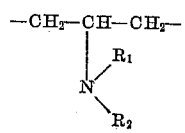

for example 3 - methanesulphonyl-10-(2:3-bis-dimethylaminopropyl)phenthiazine.

For therapeutic purposes, the bases of general Formula I are preferably employed in the form of acid addition salts containing pharmaceutically acceptable anions (such as hydrochlorides and other hydrohalides, 8-chlorotheophyllinates, phosphates, nitrates, sulphates, maleates, fumarates, citrates, tartrates, oxalates, methanesulphonates and ethanedisulphonates) or of quaternary ammonium salts obtained by reaction with organic halides (e.g. methyl or ethyl iodide, chloride or bromide or allyl or benzyl chloride or bromide) or other reactive esters conveying pharmaceutically acceptable anions.

The following examples show how the invention may be put into practice. The melting points stated were determined on the Kofler bench.

*Example I*

Sodamide (0.65 g.) is added to a solution of 3-methanesulphonylphenthiazine (4 g.) in anhydrous xylene (40 cc.) maintained at 120° C. and the mixture is then heated under reflux for 45 minutes. 3-dimethylamino-1-chloropropane (1.95 g.) dissolved in anhydrous xylene (7 cc.) is added over 15 minutes to the suspension of the sodium salt obtained while still under reflux, and the mixture is boiled for 4½ hours.

After cooling, the suspension obtained is agitated with water (50 cc.) and ether (25 cc.) and the basic products are extracted several times with dilute sulphuric acid. After the combined acid solutions have been made alkaline with pure sodium hydroxide solution (d.=1.33), the oily base is extracted several times with ether and the combined ethereal solutions are then washed with water and dried over sodium sulphate. After evaporation of the solvent under reduced pressure, a crude oily base (4.4 g.) is obtained.

The crude base is purified by conversion into the hydrochloride in anhydrous ethanol by the action of ethereal hydrogen chloride. After recrystallisation from a mixture of ethanol and ether, 3-methanesulphonyl-10-(3-dimethylaminopropyl)phenthiazine hydrochloride (2.65 g.) is obtained, M.P. 158–160° C. (with decomposition).

3-methanesulphonylphenthiazine, M.P. 164° C., can be obtained, together with 1-methanesulphonylphenthiazine, M.P. 144° C., by the action of sulphur in the presence of a little iodine at about 150 to 180° C. on 3-methanesulphonyldiphenylamine, M.P. 109° C. This latter compound is obtained by the decarboxylation of 2-carboxy-3'-methanesulphonyldiphenylamine, M.P. 185° C.

*Example II*

3-methanesulphonylphenthiazine (20 g.) is boiled with sodamide (3.24 g.) in anhydrous xylene (200 cc.) for 1 hour. 3-dimethylamino-2-methyl-1-chloropropane (9.8 g.) in anhydrous xylene (35 cc.) is added and heated under reflux for 20 hours. The solution is then washed with water and extracted several times with 10% sulphuric acid. The acid portions are combined, made alkaline with sodium hydroxide (d.=1.33) and extracted with ether. After drying the ethereal solution over anhydrous potassium carbonate and evaporating the solvent under reduced pressure, 3-methanesulphonyl-10-(3-dimethylamino-2-methylpropyl)phenthiazine (20.8 g.) is obtained, M.P. 138° C.

The corresponding hydrochloride, recrystallised from a mixture of acetone and ether, melts at 229–230° C.

Proceeding in a similar manner, the following products can be obtained:

3 - methanesulphonyl - 10 - (3 - pyrrolidino - 2 - methylpropyl)phenthiazine, M.P. 162–163° C.

3 - methanesulphonyl - 10 - (3 - 4' - methyl - 1' - piperazinyl-2-methylpropyl)phenthiazine, M.P. 170° C.

3 - methanesulphonyl - 10 - (3 - 4' - methyl - 1' - piperazinylpropyl)phenthiazine, the acid difumarate of which melts at 177° C.

3 - methanesulphonyl - 10 - (3 - pyrrolidinopropyl)phenthiazine, M.P. 75–76° C., the acid oxalate of which melts at 171–172° C.

*Example III*

3-dimethylamino-2-propyl 3-methanesulphonylphenthiazine-10-carboxylate (10 g.) in o-dichlorobenzene (50 cc.) is boiled for 3½ hours until evolution of carbon dioxide ceases. After cooling, ether (50 cc.) is added and the mixture is washed with water, and extracted several times with 10% hydrochloric acid. The acid portions are combined, made alkaline with sodium hydroxide solution (d.=1.33) and extracted several times with ether. The combined ethereal solutions are dried over anhydrous potassium carbonate and the solvent distilled under reduced pressure. 3-methanesulphonyl-10-(2-dimethylaminopropyl)phenthiazine (8 g.) is obtained, the hydrochloride of which, recrystallised from a mixture of acetone and ether, melts at 238–240° C.

The initial ester, the hydrochloride of which melts at 218–219° C., can be prepared by heating in toluene 1-dimethylaminopropan-2-ol with 3-methanesulphonylphenthiazine-10-carbonyl chloride, M.P. 203° C., itself prepared by the action of phosgene on 3-methanesulphonyl-phenthiazine in toluene in the presence of pyridine.

*Example IV*

1:2-bis-dimethylamino-2-propyl 3-methanesulphonyl-phenthiazine-10-carboxylate (10 g.) is boiled for 2 hours in o-dichlorobenzene (50 cc.) and the reaction products are treated as in Example II. 3-methanesulphonyl-10-(2:3-bis-dimethylaminopropyl)phenthiazine (4 g.), M.P. 113° C., is thus obtained.

The initial ester, M.P. 125–126° C., can be prepared as in Example II using 1:3-bis-dimethylaminopropan-2-ol.

*Example V*

3 - methanesulphonyl - 10 - (3 - toluene - p - sulphonyloxypropyl)phenthiazine (3 g.) is boiled for 2 hours in anhydrous toluene (40 cc.) with anhydrous piperidine (1.22 g.). After cooling, the crystalline suspension obtained is diluted with ether (100 cc.) and washed several times with water. Extraction is carried out with 10% hydrochloric acid. After making the acid portions alkaline with sodium hydroxide solution (d.=1.33) and extraction with ether, the ethereal solution is dried over anhydrous sodium sulphate and the solvent distilled off under reduced pressure. 3 - methanesulphonyl-10-(3-piperidinopropyl)-phenthiazine 1 g.) is obtained, the hydrochloride of which, recrystallised from a mixture of acetone and ether, melts at 180° C. (with decomposition).

3 - methanesulphonyl - 10 - (3 - toluene - p - sulphonyloxypropyl)phenthiazine can be prepared by the condensation in pyridine of toluene-p-sulphonylchloride with 3-methanesulphonyl - 10 - (3 - hydroxypropyl)phenthiazine, M.P. 112–113° C., itself prepared by the acid hydrolysis of 3-methanesulphonyl - 10 - (3-tetrahydropyranyloxypropyl))phenthiazine obtained by the condensation in boiling xylene in the presence of sodamide of 3-tetrahydropyranyloxy-1-chloropropane with 3-methanesulphonylphenthiazine.

Proceeding in a similar manner, the following products can be obtained:

3 - methanesulphonyl - 10 - (3 - diethylaminopropyl)phenthiazine, the hydrochloride of which melts at 186–187° C.

3-methanesulphonyl-10-(3-4′-hydroxyethyl-1′-piperazinylpropyl)phenthiazine, the bis-methanesulphonate of which melts at 158–160° C. (with decomposition).

3 - methanesulphonyl - 10 - (3 - methylaminopropyl)phenthiazine, the hydrochloride of which melts at 167° C.

*Example VI*

3-methylanesulphonyl-10-(3-4′-hydroxyethyl-1′-piperazinylpropyl)phenthiazine (2.1 g.) is boiled for 1½ hours in anhydrous pyridine with acetic anhydride (2.8 cc.). The excess solvent is then removed under reduced pressure and the residue obtained is made alkaline with 5% aqueous potassium carbonate solution (20 cc.). After extraction with chloroform, the chloroform solutions are dried over anhydrous potassium carbonate and the solvent is distilled off under reduced pressure. 3-methanesulphonyl - 10 - (3 - 4′ - acetoxyethyl - 1′ - piperazinylpropyl)phenthiazine (2.2 g. is obtained, the acid dimaleate of which recrystallised from ethanol, melts at 173–174° C.

*Example VII*

3 - methanesulphonyl - 10 - (3 - aminopropyl)phenthiazine (1.6 g.) in pure dioxan (30 cc.) is neutralised with N hydrochloric acid (4.6 cc.). An aqueous 30% solution of formaldehyde (20 g.) and platinum oxide (0.2 g.) is added to this solution and the mixture strongly agitated under a slight pressure of hydrogen at ordinary temperature for 18 hours. After removal of the platinum by filtration and evaporation of the solvent under reduced pressure, the residue obtained is treated with water (50 cc.) and N hydrochloric acid (5 cc.). The precipitate obtained is removed by filtration and the filtrate made alkaline with sodium hydroxide (d.=1.33). After extraction with ether, the ethereal solution is dried over anhydrous sodium sulphate and the solvent distilled. 3-methanesulphonyl - 10 - (3 - dimethylaminopropyl)phenthiazine (1 g.) is obtained, the picrate of which melts at 141–142° C.

The initial 3-methanesulphonyl-10-(3-aminopropyl)-phenthiazine can be obtained by heating 3-methanesulphonyl-10-(3-toluene-p-sulphonyloxypropyl)phenthiazine with excess ammonia in toluene at 110° C.

*Example VIII*

2 - bromo - 2′ - (3 - dimethylaminopropylamino) - 4′-methanesulphonyldiphenyl sulphide (9.9 g.) in dimethyl formamide (60 cc.) is heated under reflux for 12 hours with anhydrous potassium carbonate (3.3 g. and copper powder (0.3 g.). The solvent is removed under reduced pressure and the residue is taken up in chloroform (200 cc.) and water (200 cc.). After decanting the chloroform layer it is extracted several times with 10% hydrochloric acid. The acid solutions are then made alkaline with sodium hydroxide (d.=1.33) and extracted with ether. After drying the ethereal solution over anhydrous sodium sulphate and evaporating the solvent, 3-methanesulphonyl-10-(3-dimethylaminopropyl)phenthiazine (3.5 g.) is obtained. The corresponding hydrochloride, recrystallised from ethanol, melts at 158–160° C.

The starting material can be prepared by the condensation in the presence of sodamide in xylene of 1-dimethylamino-3-chloropropane with 2-bromo-2′-amino-4′-methanesulphonyldiphenyl sulphide, M.P. 128° C.

*Example IX*

3 - methanesulphonyl - 10 - (3 - dimethylamino - 2 - methylpropyl)phenthiazine (10 g.) in pure acetic acid (85 cc.) is treated at 10° C. with 130 vol. hydrogen peroxide (2.56 g.) and sulphuric acid (d.=1.83, 1.41 g.) in acetic acid (25 cc.). After standing for 2 days at ordinary temperature, the solution is poured into a mixture of water (150 cc.) and pure sodium hydroxide (d.=1.33, 200 cc.) at a temperature below 10° C. After extraction with chloroform, the solution is dried over calcium chloride and the solvent is evaporated. A crude base (11.2 g.) is obtained.

The crude base is purified by dissolving in pure benzene and filtering through an alkaline alumina column. After successive elutions with benzene and a mixture of benzene and ethyl acetate, the solvents are evaporated and 3 - methanesulphonyl - 9 - oxy - 10 - (3 - dimethylamino - 2 - methylpropyl)phenthiazine (2.5 g.), M.P. 166–167° C., is obtained.

We claim:

1. 3 - methanesulphonyl - 10 - (3 - dimethylaminopropyl)phenthiazine.

2. 3 - methanesulphonyl - 10 - (3 - dimethylamino - 2-methylpropyl)phenthiazine.

3. 3 - methanesulphonyl - 10 - (3 - 4′ - methyl - 1′ - piperazinyl-2-methylpropyl)phenthiazine.

4. 3-methanesulphonyl - 10 - (3 -- 4′ - hydroxyethyl - 1′-piperazinylpropyl)phenthiazine.

5. 3 - methanesulphonyl - 10 - (3 - 4' - acetoxyethyl-1'-piperazinylpropyl)phenthiazine.

6. A member selected from the group consisting of compounds of the formula

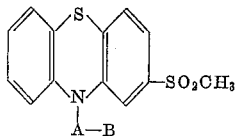

wherein A is a lower alkylene radical having at least two carbon atoms separating the two nitrogen atoms and B is a member of the class consisting of amino, mono-lower alkyl amino, di(lower alkyl) amino, 1-pyrrolidino, 1-piperidino, 1-morpholina, 1-piperazino, 4-lower alkyl-1-piperazino, 4-hydroxy lower alkyl-1-piperazino and 4-acetoxy lower alkyl-1-piperazino and the acid addition salts thereof having pharmaceutically acceptable anions.

References Cited in the file of this patent
UNITED STATES PATENTS

| | | |
|---|---|---|
| 2,272,498 | Zerweck et al. | Feb. 10, 1942 |
| 2,534,237 | Cusic | Dec. 19, 1950 |
| 2,789,978 | Rath | Apr. 23 1957 |